United States Patent [19]
Chevallier

[11] 3,906,974
[45] Sept. 23, 1975

[54] MARINE LOADING ARM
[75] Inventor: Daniel Marcel Chevallier, Sens, France
[73] Assignee: Societe Technique et Commercial d'Installations Industrielles "Luceat", Sens, France
[22] Filed: June 6, 1974
[21] Appl. No.: 476,828

[52] U.S. Cl. .................... 137/15; 137/615; 285/15
[51] Int. Cl.[2] ........................................ F16L 27/00
[58] Field of Search ........... 137/615, 315, 316, 616, 137/616.3, 616.5, 616.7, 15; 285/15

[56] References Cited
UNITED STATES PATENTS
| | | | |
|---|---|---|---|
| 1,596,755 | 8/1926 | Muller | 137/616.5 X |
| 1,654,300 | 12/1927 | McGee et al. | 137/615 |
| 3,651,832 | 3/1972 | Meyer | 137/615 |

FOREIGN PATENTS OR APPLICATIONS
| | | | |
|---|---|---|---|
| 558,875 | 3/1957 | Italy | 137/616.5 |

Primary Examiner—Martin P. Schwadron
Assistant Examiner—Robert J. Miller
Attorney, Agent, or Firm—C. E. Tripp

[57] ABSTRACT

A selectively connectible flange-type coupling is located between the inboard arm of a marine loading arm and the usual vertical riser pipe so that, when the flanges are in coupled relation, the inboard arm is supported directly by the riser, permitting the swivel joints between the riser and the inboard arm to be disconnected and serviced.

9 Claims, 5 Drawing Figures

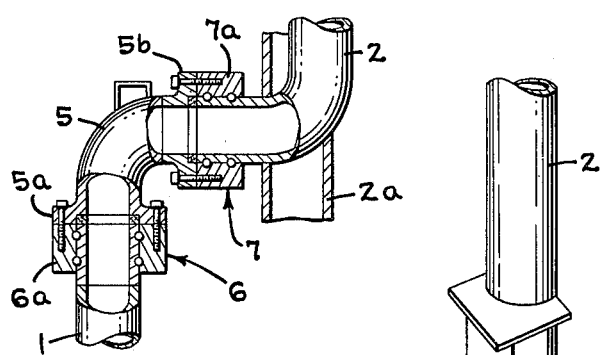
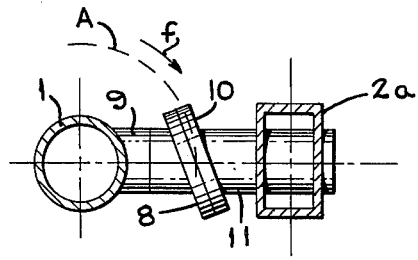
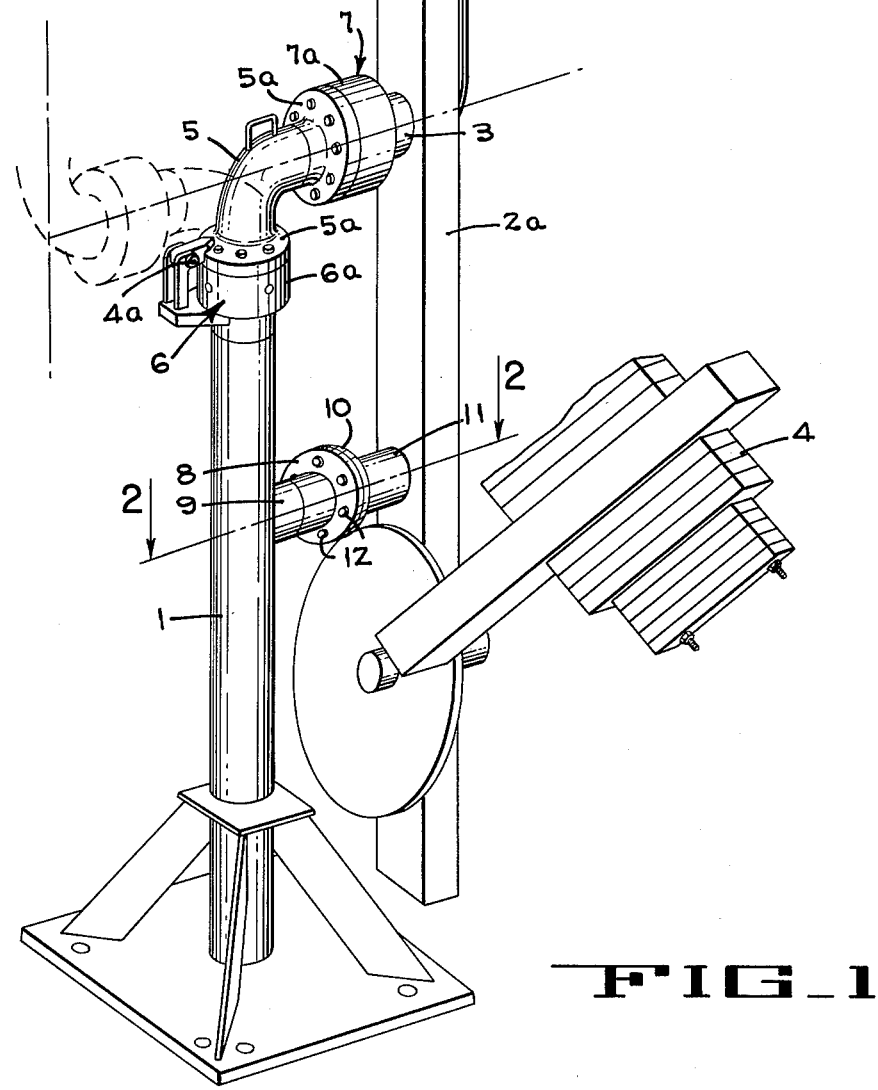

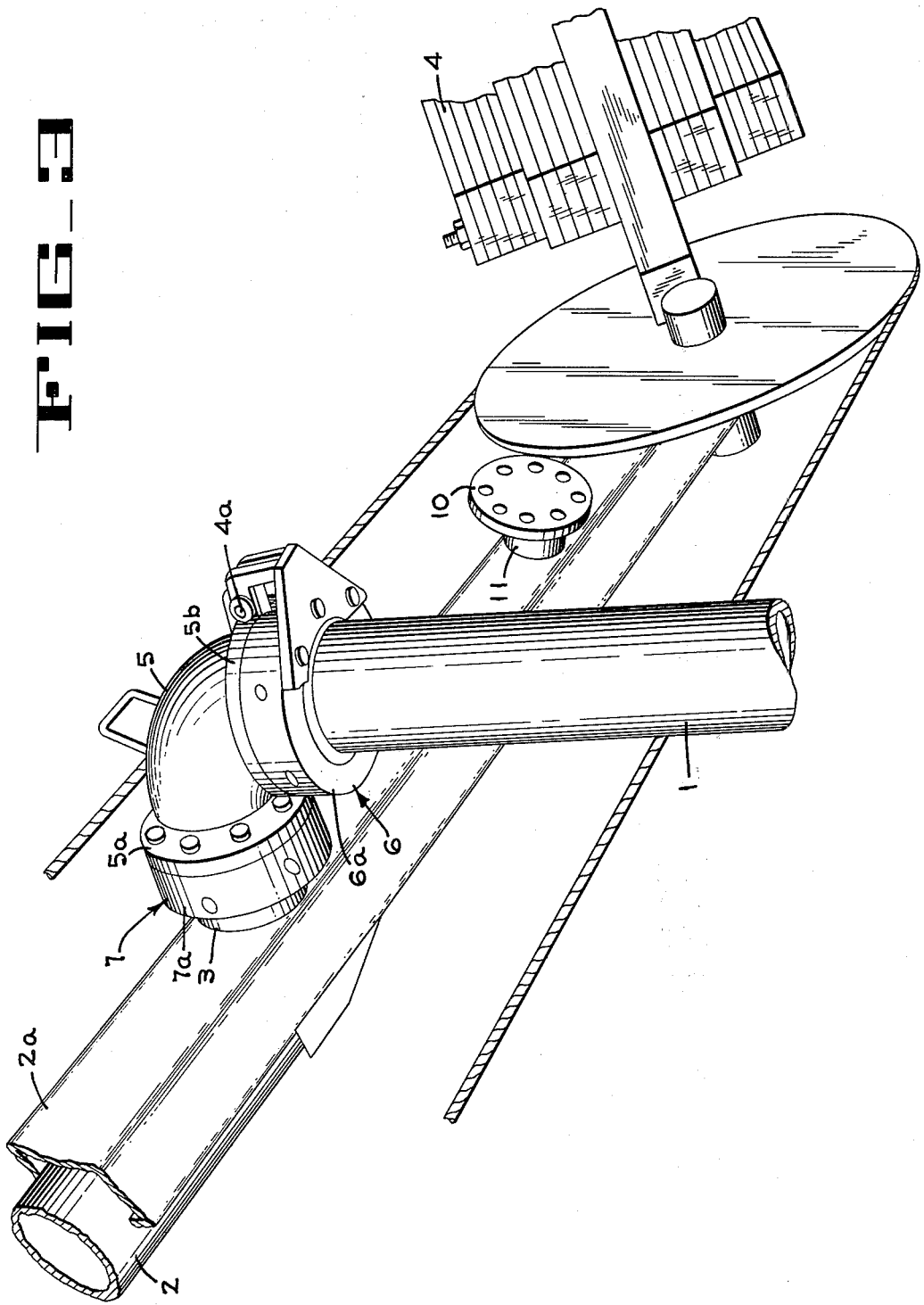
FIG_3

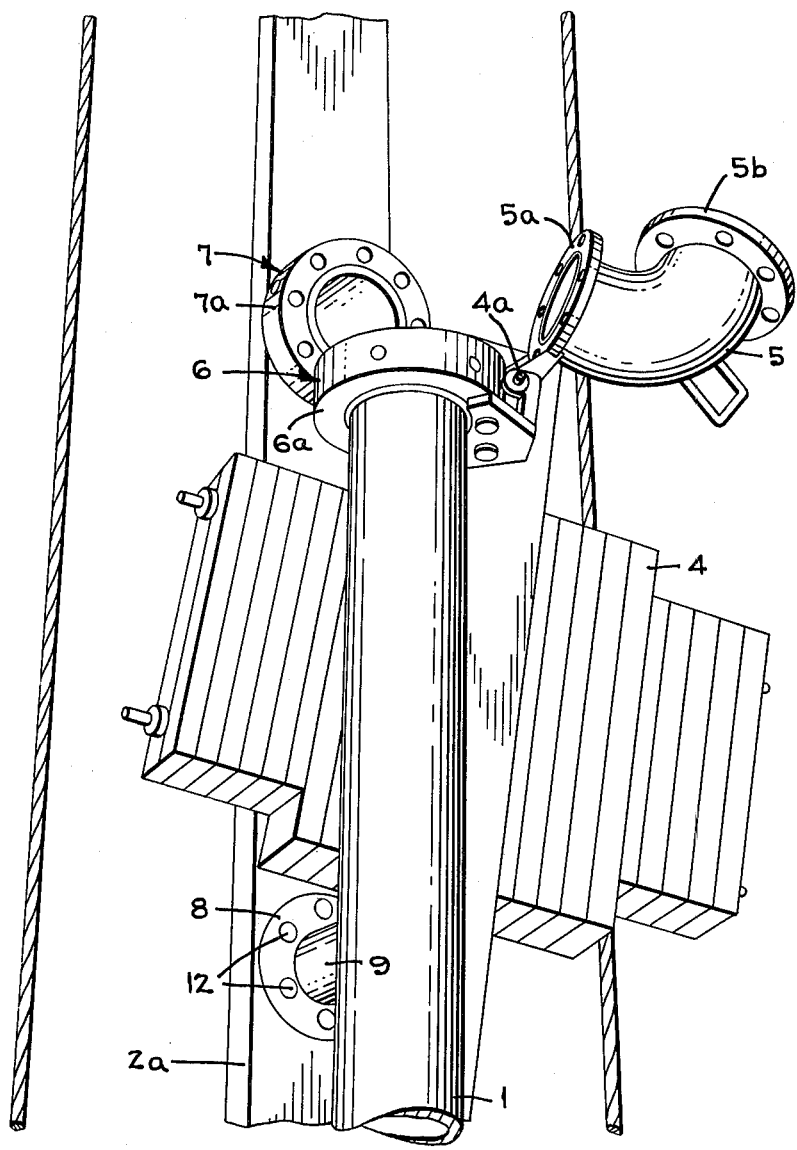
FIG_4

MARINE LOADING ARM

BACKGROUND OF THE INVENTION

1. Field of the Invention

The present invention pertains to marine loading arms and, more particularly, to apparatus for facilitating the servicing of certain joints of such arms that must be kept fluid-tight.

2. Description of the Prior Art

Typical marine loading arm systems comprise a vertical riser pipe leading downwardly to a storage tank, a tubular inboard arm that is pivoted to and disposed in flow communication with the upper end of the riser, a tubular outboard arm that is pivoted on the outer end of the inboard arm, and a coupling at the outer end of the outer arm for connecting this fluid-conveying system to a riser or supply pipe of a ship. In order that the inner and outer arms can be maneuvered in various planes while maintaining fluid-tight connections between the various elements of the system, joints are provided between the riser and the inboard arm which have packing elements that are subject to wear in service. In the past, when the arms were made of relatively small tubular stock, as for example, stock that is 8–10 inches in diameter, it was relatively easy to service the packing in the joints since a small hoist, or even a forklift truck, could be positioned to support the arm assembly while the joint between the riser and the inboard arm was dismantled to obtain access to the packing. However, as the arms became larger in diameter and longer in length, the use of a small hoist became impractical, and the servicing of the joints became expensive.

The U.S. Patent to Ashton No. 3,590,870 discloses the use of a bracket disposed between the riser pipe and the inboard arm for transferring the load on the arm directly to the riser—thus making possible the use of a removable elbow which, when removed from the joint, exposed the packing for servicing. The U.S. Pat. to Bily No. 2,927,607 also discloses the use of a bracket between the riser and the inboard arm.

SUMMARY OF THE INVENTION

The marine loading arm of the present invention features a pair of mating flanges, one rigidly supported from the riser pipe and the other rigidly supported on an extension of the inboard arm. During normal operation of the marine arm for transferring fluid between a ship and a storage tank on the quay or wharf, the mating flanges are in disconnected condition. At this time the riser-flange is stationary, while the flange on the inboard arm swings with the inboard arm.

When servicing of the packing of the joint between the riser and the inboard arm is needed, the inboard arm is swung to a vertical position wherein its flange is in confronting relation with the flange on the riser. Bolts are projected through aligned holes in the flanges and the flanges are connected together in rigid fixed relation. The inboard arm is then supported directly from the riser, and the joint between the members can be broken open and serviced.

BRIEF DESCRIPTION OF THE DRAWINGS

FIG. 1 is a perspective view of the apparatus of the present invention, with an adjusted position of one member being shown in phantom lines.

FIG. 1A is an elevation of a portion of FIG. 1 with parts broken away and parts shown in section.

FIG. 2 is a section taken along line 2—2 of FIG. 1.

FIG. 3 is an enlarged perspective of a portion of FIG. 1, showing the inboard arm of the assembly in a rotated position and showing a flange plate with a different orientation relative to the inboard arm than the plate of FIGS. 1–2.

FIG. 4 is an enlarged perspective of the apparatus of FIG. 3 but showing the inboard arm in a different rotated position.

The apparatus for loading and unloading fluids as shown, comprises in known manner, a fixed vertical base or riser pipe 1, an inboard beam or arm 2 with a rigid tubular horizontal pivot 3 and a counterweight 4, and an elbow coupling 5. The coupling 5 has a flange 5a adapted to be bolted to the female member 6a of a swivel joint 6 that is rotatable on the upper end of riser 1. The coupling 5 has a second flange 5b adapted to be bolted to the female member 7a of a swivel joint 7 that is rotatable on the horizontal pivot 3. Also, the elbow coupling 5 is pivoted on the member 6a by a pin 4a.

In accordance with the invention, a flange 8 formed on a circular plate, which is rigidly fixed on a tubular support arm 9, is capable of being brought into position opposite a flange 10 on a second circular plate, said second plate being secured to a support arm 11 that is rigid with an extension 2a of the inboard arm 2.

When the flanges 8 and 10 are brought against each other and the holes in the flanges are aligned, it is only necessary to join them together by means of bolts 12. From the moment the flanges are bolted together, the elbow coupling 5 can be unbolted from the swivel joint 7 and from the swivel joint 6, thereby enabling it to be pivoted on pin 4a so as to simultaneously expose the packing between the flange 5b and the joint 7, and between the flange 5a and the joint 6. The worn packings can then be replaced, and the elbow can be pivoted back into position and bolted.

During the whole operation of dismantling of the elbow coupling, the replacement of the used packings and the re-assembly of the elbow coupling, the inboard arm 2 and the extension 2a has remained in vertical position, fixed to and supported by the riser 1 through the connected flange plates 8 and 10.

The bringing together of the plates 8 and 10 can be effected in one of two ways. In one method, the inboard arm 2 is brought to the generally horizontal position of FIG. 3 while causing it to rotate about the vertical pivot axis provided by swivel joint 6, until the horizontal pivot 3 attached to the inboard arm is above and in vertical alignment with the support arm 9 attached to the riser 1. Then the inboard arm is pivoted about the horizontal axis provided by swivel joint 7, causing the flange plate 10 to approach the flange plate 8.

When this method of connecting and disconnecting the inboard arm and the riser is used, it is desirable that the plane of contact of the flanges 8 and 10 be perpendicular to the support arms 9 and 11 respectively, which are themselves at right angles to the riser 1 and arm extension 2a respectively.

In the second method of bringing the flange plates 8 and 10 together, the vertical plane of contact of the two plates 8 and 10 is inclined with respect to the axis of support arms 9 and 11, as seen in FIG. 2. When the inboard arm is swung to the phantom line position of FIG. 1, the zone of swinging movement of the arm is completely unobstructed during the fluid transfer operation. When servicing is necessary, the flanges 8 and 10 can be brought into position facing each other in the following manner. The arm 1 is pivoted about swivel 7 to a vertical position and is then swung about the vertical axis of swivel 6 until the two plates move into abutting contact.

In order to proceed in this second manner, the inclination of the vertical plane of contact is chosen in such a way that the periphery of the plate 8 of the fixed riser 1 is inside the mean displacement arc A of the flange plate 10 in the direction of rotation indicated by the arrow *f*.

From the foregoing description it will be evident that the present invention provides a simple, effective method and apparatus for temporarily supporting a marine loading arm from a rigid support so that the elbow coupling between the riser and the inboard arm can be serviced.

It will be understood that modifications and variations may be made without departing from the scope of the present invention.

What is claimed is:

1. In a marine loading arm system having an inboard arm, a riser, a riser elbow, and pipe swivel joints interconnecting the riser elbow with said riser and said inboard arm, said riser elbow being removably attached to said riser and inboard arm, the improvement which comprises an assembly for rigidly securing the inboard arm to the riser and supporting said inboard arm in its secured position while the riser elbow is disconnected from said inboard arm, said assembly comprising a first rigid support member connected to said riser, a second rigid support member connected to said inboard arm, and means for securing said first and second support members together in rigid fixed relation after the inboard arm has been pivoted relative to the riser to position said support members in adjacent positions, whereby the riser elbow can be removed from the loading arm system to facilitate servicing the pipe swivel joints without movement of the inboard arm from its rigidly secured and supported position.

2. Apparatus according to claim 1 wherein each of said support members includes a flat planar surface movable into face-to-face contact for coupling of said support members.

3. Apparatus according to claim 2 wherein the riser is an upright member and the inboard arm is pivotal about a generally horizontal axis relative to the riser, said apparatus being further characterized by the plane of the contact face of each of said support members being substantially perpendicular to said horizontal pivot axis.

4. In a marine loading arm system having a riser disposed in a vertical plane, an inboard arm mounted on the riser for swinging movement about a horizontal axis and also a vertical axis relative to the riser, and an elbow coupling swiveled to said riser and to said inboard arm, the improvement which comprises a first rigid support member connected to said riser, a second rigid support member connected to said inboard arm, each of said support members including a planar contact surface, said surfaces movable into face-to-face contact for coupling said support members, the contact surface of said second support member being movable toward the contact surface of said first support member incident to pivoting of said inboard arm about said horizontal axis to bring said arm to a generally vertical attitude followed by pivoting of said inboard arm about said vertical axis.

5. The apparatus of claim 1 wherein said support members are rigid arms secured respectively to the inboard arm and to the riser and projecting at right angles therefrom, and said selective securing means comprises a pair of apertured flanges, one rigid with the outer end of each support arm, and fastening means selectively positionable in aligned apertures of said flanges to lock said flanges in face-to-face abutting contact.

6. In a marine loading arm system having a vertically disposed riser, an inboard arm mounted on the riser for pivotal movement about horizontal and vertical axes, and an elbow coupling swiveled to said riser and to said inboard arm, the improvement comprising a first rigid support member connected to said riser, a second rigid support member connected to said inboard arm, means for selectively securing said first and second support members together in rigid fixed relation after the inboard arm has been pivoted relative to the riser to position said support members in adjacent positions, and wherein the swiveled connection between the elbow coupling and the riser comprises a collar swiveled on the end of the riser, and a hinge connection between said collar and the elbow coupling.

7. A method for preparing the pipe swivel joints that pivotally interconnect the riser, the riser elbow, and the inboard arm of a marine loading arm for servicing, comprising the steps of a. positioning the inboard arm in an erect attitude wherein a portion thereof extends alongside the riser, b. rigidly yet releasably securing the inboard arm to the riser by auxiliary support means attached to both said inboard arm and said riser at a location spaced from the riser elbow, c. transferring to the auxiliary support means the weight imposed on the riser elbow by the inboard arm, and d. disconnecting the riser elbow from the adjacent pipe swivel joints.

8. The method of claim 7 including the step of pivoting the riser elbow away from contact with the adjacent pipe swivel joints, thereby exposing the packing chambers of said joints.

9. The method of claim 8 wherein the riser elbow is pivoted about a hinge axis that is perpendicular to the axis through the riser.

* * * * *